J. K. PUTNAM.
SEPARATOR FOR WELLS.
APPLICATION FILED SEPT. 24, 1917.
1,279,758.
Patented Sept. 24, 1918.
2 SHEETS—SHEET 2.
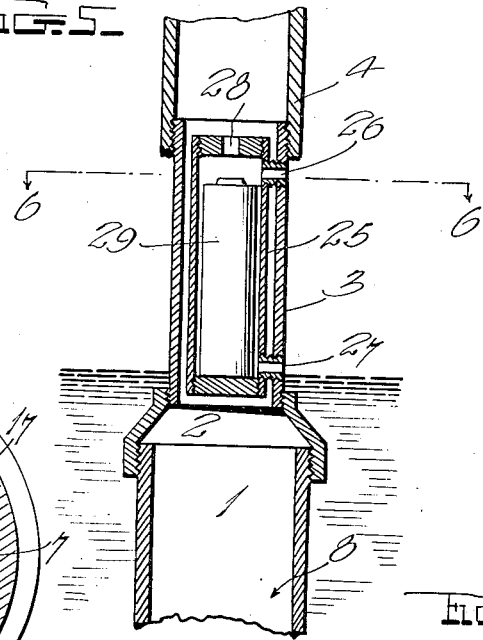
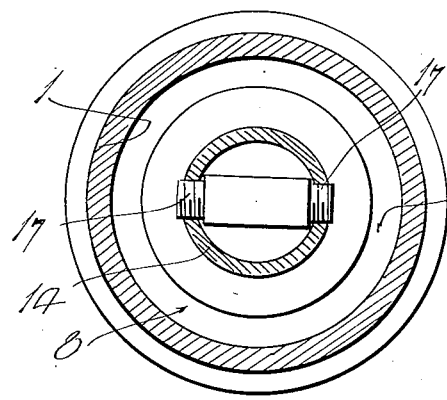
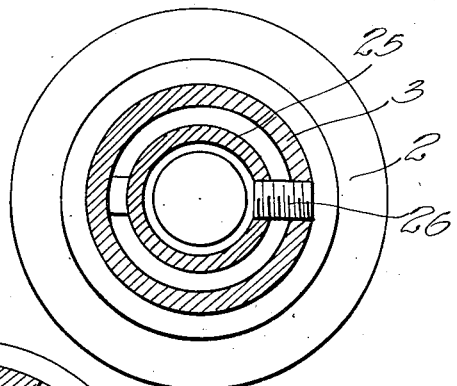
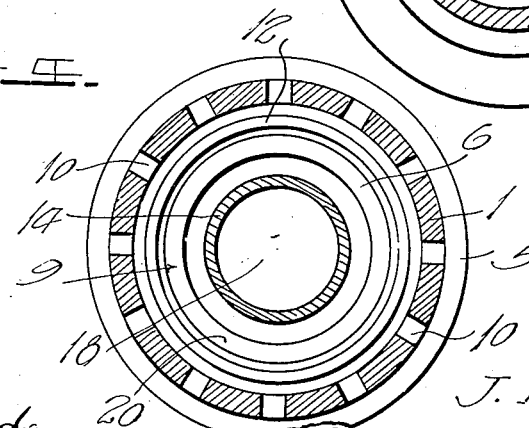
Witness
H. Woodard
Inventor
J. K. Putnam
By H. B. Wilson & Co.
Attorneys

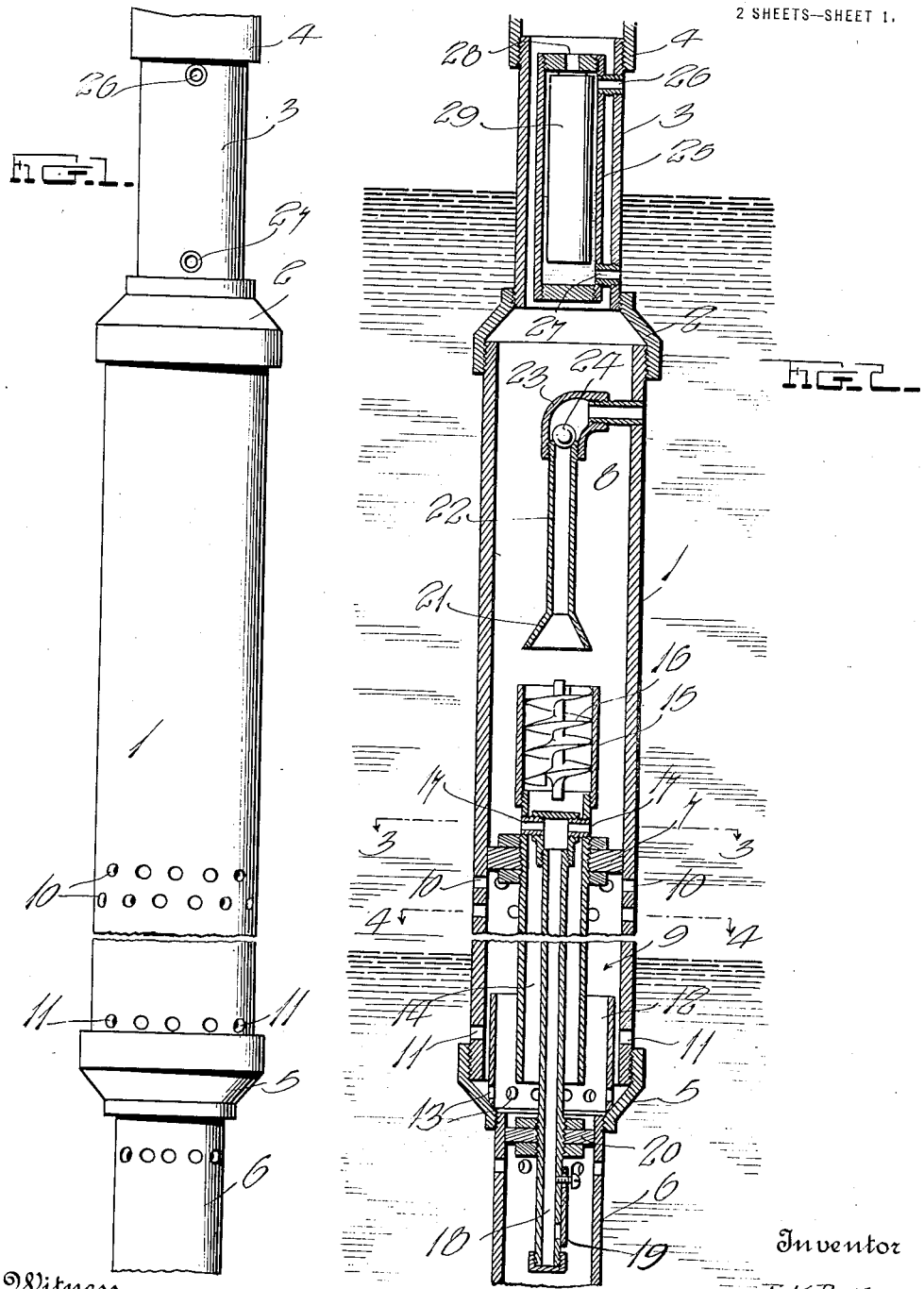

UNITED STATES PATENT OFFICE.

JAMES K. PUTNAM, OF TULSA, OKLAHOMA.

SEPARATOR FOR WELLS.

1,279,758.  Specification of Letters Patent.  Patented Sept. 24, 1918.

Application filed September 24, 1917. Serial No. 193,026.

*To all whom it may concern:*

Be it known that I, JAMES K. PUTNAM, a citizen of the United States, residing at Tulsa, in the county of Tulsa and State of Oklahoma, have invented certain new and useful Improvements in Separators for Wells; and I do declare the following to be a full, clear, and exact description of the invention, such as will enable others skilled in the art to which it appertains to make and use the same.

My invention relates to improvements in separators such as those employed in oil wells for separating the gas and sand from the liquid, so that they are prevented from entering the working parts of the pump, in which they are very injurious; and the principal object of my invention is to provide a separator of this class which may be easily and inexpensively manufactured and marketed, yet one which will be highly efficient and durable.

With the foregoing general object in view, the invention resides in the novel features of construction and unique combination of parts to be hereinafter fully described and claimed, the descriptive matter being supplemented by the accompanying drawings which form part of this specification and in which:

Figure 1 is a side elevation of the improved separator;

Fig. 2 is a vertical longitudinal section thereof;

Figs. 3 and 4 are horizontal sections on the planes indicated by the lines 3—3 and 4—4 of Fig. 2;

Fig. 5 is a vertical section similar to the upper end of Fig. 2 but illustrating the float valve in opened position; and Fig. 6 is a horizontal section of Fig. 5 of the plane of the line 6—6 thereof.

In the drawings above briefly described, the numeral 1 designates a vertically disposed cylindrical barrel whose upper end is connected by a suitable reducer 2, with a nipple 3 which is in turn connected to the suction line 4 of a common type of pump. The lower end of the barrel 1 is joined by a reducer 5 to the usual or any preferred type of hollow anchor 6 into which the sand and the like separated from the liquid, is deposited.

The barrel 1 is divided by a horizontal partition or packer 7, into an upper separating chamber 8 and a lower inlet chamber 9, the former being of greater height than the latter. The upper and lower ends of the inlet chamber 9 are formed with oil and water inlet openings 10 and 11 respectively, said openings being formed through the barrel 1 as shown clearly in Figs. 1 and 2. When installing the device, the perforations 10 will be located in the oil stratum, whereas the openings 11 will be located in the water stratum, whereby one series of perforations will supply only oil to the device, whereas water only will enter the other. Due to construction yet to be described, the oil entering the perforations 10, must pass downwardly in the inlet chamber 9 before it is discharged therefrom into the separating chamber 1, this being highly essential in order that any gas which may enter with the oil, may rise to the top of the chamber 9 and escape through the perforations 10. It is also possible that gas may enter with the water through the openings 11, but the water current is forced to so travel as to permit this gas to escape to the upper end of the chamber. The water travel is controlled in this manner by a circular upstanding baffle wall 12 which rises from the reducer 5 to a point above the openings 11, the lower end of said wall being preferably perforated at 13 to permit any sand or the like which may collect outside of the same, to pass into said wall to be carried therefrom into the separating chamber 8.

A vertical pipe 14 extends from a point adjacent the lower end of the inlet chamber 9, through the partition 7 and into the lower end of the separating chamber 8, the upper end of said pipe 14 being by preference enlarged as indicated at 15, although this construction is not absolutely essential. It will be observed that the lower end of pipe 14 is positioned within the wall 12, so that the water entering the perforations 11 cannot flow directly to said pipe, but must take a tortuous course so that most of the gas will be separated from the water and will rise to the top of the chamber 9. Positioned within the upper end of the pipe 14, is a helical web 16 of any suitable construction and rigidly secured in place, it being the function of this web to whirl the rising liquid around, so that as it leaves the upper end of the pipe, it will be thrown outwardly by centrifugal force. In moving outwardly in this manner, the liquid is separated from the sand and the gas. The sand, being the heaviest material, will drop around the pipe 14 to the bottom of the separating chamber 8 from which it passes through a pair of nipples 17 and a vertical pipe 18, into the hollow anchor 6, the lower end of said pipe having a suitable check valve 19 as shown clearly in Fig. 2. The pipe 18 is positioned centrally within the pipe 14 and passes through the bottom of the inlet chamber 9, said bottom being formed by a suitable packer or the like 20 secured in the upper end of the anchor 6.

Since any gas rising through the pipe 14 with the liquid, is too light to be thrown outwardly by centrifugal force, it will rise into the hood 21 which is positioned above the upper end of said pipe, a vertical outlet pipe 22 being provided from said hood to the exterior of the barrel 1. The pipe 22 includes an elbow 23 in which is located a check valve 24, the weight of this valve being such as to permit the gas to unseat the same between the working strokes of the pump. The valve in question, however, prevents the entrance of air upon each suction stroke of the pump as will be readily understood.

The oil, after being separated from the sand and gas, is drawn upwardly through the nipple 3 and the suction line 4 by the operation of the pump; and since it is essential that the entire separating device be submerged in order to properly operate, the nipple in question is provided with means for automatically admitting air to the suction line 4, whenever the liquid within the well, lowers beyond a predetermined level. This means could well be embodied in a number of forms, but for illustrative purposes, a casing 25 is shown mounted within the nipple by means of upper and lower nipples 26 and 27 which place said casing in communication with the well. The top of the casing 25 is provided with an air port 28, and a float valve 29 is mounted in said casing for closing this port as long as this float is buoyed upwardly by the liquid entering the casing 25 through the lower passage 27. When, however, the liquid within the well lowers beyond the level of this passage, the float automatically drops to open the port 28 as disclosed in Fig. 5. The result is that instead of creating suction through the separator and drawing liquid upwardly therethrough, the suction line 4 draws air through the upper passage 26 and the port 28, thus automatically checking the supply of liquid from the pump and signifying to the operator that the separator must be further lowered in order that it may operate as intended.

In operation, the separator is positioned within the well as indicated in Fig. 2, so that the perforations 10 are located within the oil stratum, whereas the openings 11 are positioned within the water below. When the pump is operated in the usual manner, an upward suction is created through the entire device, so that oil and water are drawn into the inlet chamber 9 through the perforations 10 and 11 respectively, the two liquids being more or less mixed in this chamber, before passing therefrom through the pipe 14. Most of the gas will be separated from the oil and water, within the chamber 9, since it is permitted to rise in said chamber and to escape through the openings 10, but any gas which may pass upwardly through the pipe 14, with the liquid, is carried off by the hood 21 and the pipe line 22. As the liquid is discharged, the web 16 acts in such a manner that it is thrown outwardly by centrifugal force, thus permitting sand and the like to drop into the lower end of the separating chamber 8, whereas the liquid is drawn from said chamber through the nipple 3 and suction line 4. All deleterious matter dropping into the lower end of the separating chamber 8, is carried therefrom through the nipples 17 and pipe 18, this matter being deposited in the hollow anchor 6 so that it can give no further trouble. Whenever the liquid in the well lowers to an extent to expose the passage 27, the float valve 29 automatically opens to suspend the passage of liquid through the suction line 4 by admitting air to this line. This signifies to the operator that the entire pump line must be lowered before further extraction of oil takes place.

The mingling of the water and oil and the simultaneously pumping out of the two, by the improved separator, is a highly advantageous feature, since by the addition of water to the oil, a comparatively thin liquid mixture results to more readily permit the sand and the like to be separated therefrom than from the relatively thick oil without water. At the upper end of the pipe 14, a considerable quantity of the water will drop by gravity from the oil and will serve to wash the collected sand and the like from the lower end of the separating chamber through the pipe 18 and into the anchor 6. The amount of water drawn from the separator with the oil, may easily be removed in any of the well known ways.

From the foregoing, taken in connection with the accompanying drawings, it will be obvious that although the improved separator is of comparatively simple and inexpensive construction, it will be highly efficient and durable. Since probably the best results are obtained from the several specific details shown and described, these features constitute the preferred form of the device, but I wish it understood that within the scope of the invention as claimed, numerous minor changes may well be made.

I claim:

1. In a separator of the class described, the combination of a separating chamber having a liquid outlet in its upper end for connection to a pump, an inlet passage into the lower end of said chamber, a collecting device over said inlet passage to receive any gas rising therethrough, means for conveying such gas to the exterior of the separating chamber, and means at the upper end of said inlet passage for throwing the liquid outwardly by centrifugal force as said liquid is discharged therefrom.

2. In a separator of the class described, the combination of a separating chamber having a liquid outlet in its upper end for connection to a pump, an inlet passage into the lower end of said chamber, a hood over said inlet passage to receive any gas rising therethrough, and means for conveying such gas to the exterior of the separating chamber, the upper end of said inlet passage being of helical formation to throw the liquid rising therethrough outwardly by centrifugal force, thus separating such liquid from the gas.

3. In a separator of the class described, the combination of a separating chamber having a liquid outlet in its upper end for connection to a pump, an inlet pipe rising into the lower end of said chamber, a hood over said pipe to collect any gas rising therethrough, means for conveying such gas to the exterior of the separating chamber, and a helical web in said pipe for throwing the liquid outwardly from the upper end thereof by centrifugal force, to separate such liquid from the gas.

4. In a separator of the class described, the combination of a separating chamber having a liquid outlet at its upper end for connection to a pump, an inlet pipe rising into the lower end of said chamber and having means at its upper end for throwing the ascending liquid outwardly by centrifugal force, to permit heavy substances to fall into the lower end of said chamber, a hollow anchor depending from said chamber, and an outlet from the lower end of said chamber into said anchor.

5. In a separator of the class described, the combination of a separating chamber having a liquid outlet at its upper end for connection to a pump, an inlet pipe rising into the lower end of said chamber and having means at and within its upper end for throwing the ascending liquid outwardly by centrifugal force, to permit heavy substance to fall into the lower end of said chamber, and an outlet pipe from the lower end of said chamber, said pipe leading downwardly through said inlet pipe to the exterior of the chamber.

6. In a separator of the class described, the combination of a separating chamber having a liquid outlet at its upper end for connection to a pump, an inlet pipe rising into the lower end of said chamber and having means at its upper end for throwing the ascending liquid outwardly by centrifugal force, to permit heavy substances to fall into the lower end of said chamber, a hollow anchor positioned below said chamber, and an outlet pipe leading from the lower end of said chamber through said inlet pipe and discharging into said anchor.

7. In a separator of the class described, the combination of a separating chamber having a liquid outlet in its top, an inlet chamber below said separating chamber and having inlet perforations in its upper end, a vertical pipe in said inlet chamber leading from a point near the lower end thereof into said separating chamber, means in said pipe for throwing the ascending liquid outwardly by centrifugal force and means over said pipe for collecting and carrying off all gas rising therethrough.

8. In a separator of the class described, the combination of a separating chamber, an inlet chamber below said separating chamber and having oil inlet perforations at its upper end and water inlet perforations at its lower end, a vertical pipe in said inlet chamber leading from a point near the lower end thereof into said separating chamber, and a baffle wall surrounding the lower end of said pipe and extending to a level above said water inlet perforations.

9. The combination with a submerged separator and a suction line for drawing liquid therethrough, of a port for admitting air into said suction line, and a float valve for closing said port until the liquid in the well has lowered to a pre-determined level.

10. An oil well separator having independent oil and water inlets for disposition respectively in the oil and water strata of the well, means for conducting the mixture of oil and water upwardly through the separator, and means for throwing this mixture outwardly by centrifugal force to permit any sand carried therein, and a large proportion of the water to fall by gravity.

11. In a separator of the class described, the combination of a vertically disposed barrel divided by a partition into a lower inlet chamber and an upper separating chamber, said inlet chamber having means for admitting liquid and permitting the escape of gas, a passage leading from said inlet chamber into said separating chamber, means at the upper end of said passage for throwing the liquid outwardly by centrifugal force, means above said passage for carrying off any gas rising therethrough, an outlet passage for any foreign matter dropping into the separating chamber from the liquid, and an outlet from the upper end of said barrel for connection to a pump.

12. In a separator of the class described, the combination of a vertically disposed barrel divided by a partition into a lower inlet chamber and an upper separating chamber, said inlet chamber having means for admitting liquid and permitting the escape of gas, a vertical pipe rising from a point adjacent the lower end of the inlet chamber into the lower end of the separating chamber, the upper end of said pipe having therein a helical web for throwing the ascending liquid outwardly by centrifugal force, to permit any foreign matter therein to drop to the lower end of said separating chamber, an outlet from said end adapted to convey said foreign matter to the exterior of the separator, means above said helical web for carrying off any gas discharged from said pipe, and an outlet from the upper end of the separating chamber adapted for connection to a pump.

In testimony whereof I have hereunto set my hand in the presence of two subscribing witnesses.

JAMES K. PUTNAM.

Witnesses:
MAX WEHNERT,
E. D. FORQUER.